United States Patent [19]

Unseth

[11] Patent Number: 5,330,200
[45] Date of Patent: Jul. 19, 1994

[54] GASKET ASSEMBLY FOR SEALED JOINTS EXPERIENCING THERMALLY INDUCED MOVEMENT

[75] Inventor: Joseph D. Unseth, Peoria, Ill.

[73] Assignee: Caterpillar, Inc., Peoria, Ill.

[21] Appl. No.: 986,164

[22] Filed: Dec. 4, 1992

[51] Int. Cl.⁵ .................... F16J 15/10; F16J 15/12
[52] U.S. Cl. ..................... 277/9; 277/235 B
[58] Field of Search ............. 277/9, 11, 233, 234, 277/235 B

[56] References Cited

U.S. PATENT DOCUMENTS

| | | | |
|---|---|---|---|
| 2,119,158 | 5/1938 | Frey | 277/235 B |
| 3,841,289 | 10/1974 | Meyers . | |
| 4,103,913 | 8/1978 | McDowell | 277/235 B |
| 4,471,968 | 9/1984 | Schlaupitz et al. . | |
| 4,676,515 | 6/1987 | Cobb | 277/235 B |
| 4,705,278 | 11/1987 | Locacius et al. | 277/235 B |
| 4,723,783 | 2/1988 | Belter et al. | 277/235 B |
| 4,813,687 | 3/1989 | Nakayama et al. . | |
| 4,826,708 | 5/1989 | Udagawa . | |
| 5,022,661 | 6/1991 | Nakasone . | |
| 5,122,214 | 6/1992 | Zurfluh et al. | 277/235 B X |
| 5,150,910 | 9/1992 | Udagawa | 277/235 B |

FOREIGN PATENT DOCUMENTS

| | | | |
|---|---|---|---|
| 500273 | 8/1992 | European Pat. Off. | 277/235 B |
| 506996 | 10/1992 | European Pat. Off. | 277/235 B |
| 190738 | 11/1982 | Japan | 277/235 B |
| 278223 | 10/1927 | United Kingdom | 277/235 B |

*Primary Examiner*—William A. Cuchlinski, Jr.
*Assistant Examiner*—Scott W. Cummings
*Attorney, Agent, or Firm*—Diana L. Charlton

[57] ABSTRACT

The use of gasket assemblies to compensate for thermally induced gasket movement between a cylinder head and an exhaust manifold of an internal combustion engine is becoming more important in increasing the life of the engine components. The ability to compensate for the thermally induced movement increases the life of the exhaust manifold, connecting bolts, and the gasket assembly. The subject gasket assembly has a first substantially flat plate which has an outer side and an opposite inner side and a second substantially flat plate which has an outer side and an opposite inner side. The plates each are formed from a material having a generally high coefficient of friction. A first layer of material is attached to the inner side of the first plate to define a first plate assembly with the material having a generally low coefficient of friction. A second layer of material is attached to one of the sides of the second plate to define a second plate assembly with the material having a generally low coefficient of friction. A means is provided for interconnecting the first and second plate assemblies so that the first and second layers of material are in contacting relationship.

13 Claims, 3 Drawing Sheets

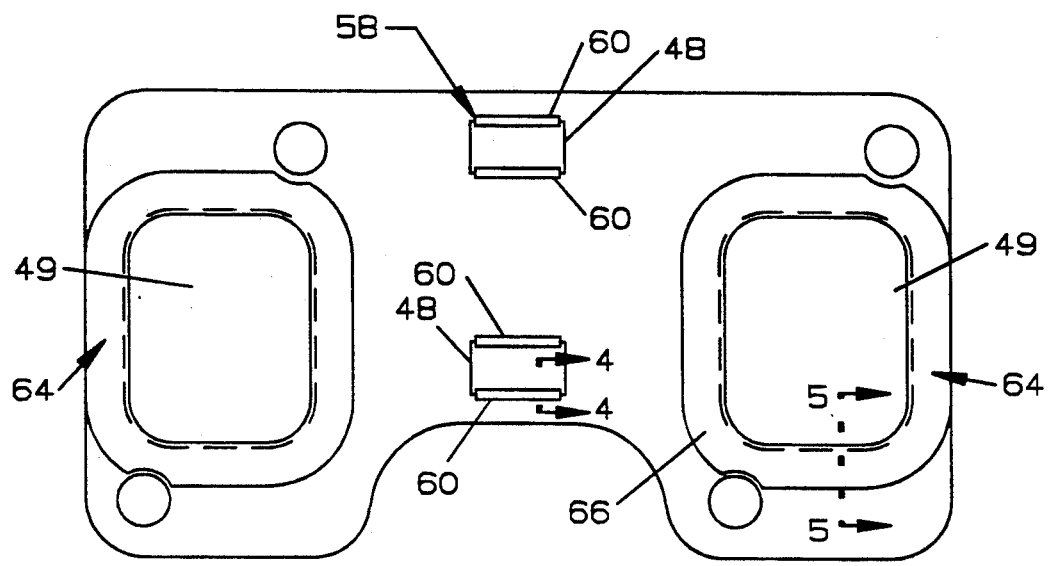
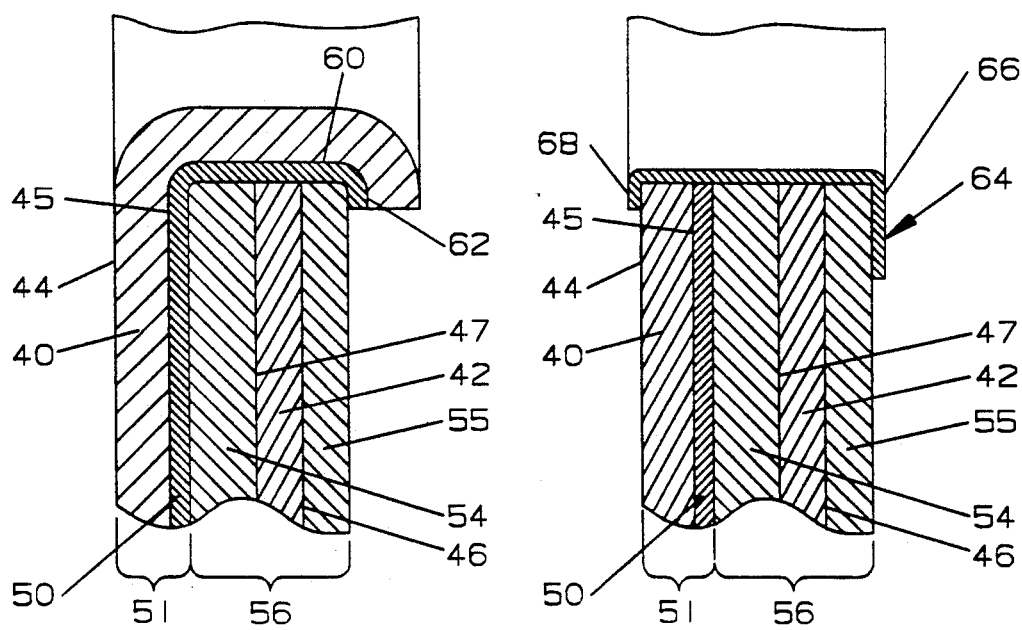

GASKET ASSEMBLY FOR SEALED JOINTS EXPERIENCING THERMALLY INDUCED MOVEMENT

DESCRIPTION

1. Technical Field

This invention relates to a gasket assembly and more particularly to a gasket assembly for controlling thermally induced gasket movement between a cylinder head and an exhaust manifold of an internal combustion engine.

2. Background Art

Various prior art gaskets have been utilized to achieve a fluid pressure tight seal between a cylinder head and exhaust manifold of an internal combustion engine. During normal operation of the engine, cyclic temperature changes can cause thermal expansion and contraction of various components at varying rates. For example, the exhaust manifold experiences thermal expansion greater than the thermal expansion of the cylinder head causing relative movement between the exhaust manifold and the cylinder head. The relative movement between the exhaust manifold and the cylinder head, if not absorbed by the gasket positioned between the two components, can cause the exhaust manifold or manifold gasket to crack or can destroy the connecting bolts used for connecting the exhaust manifold to the cylinder head. Most prior art gaskets have failed in the past to compensate for the relative movement between the exhaust manifold and the cylinder head leading to ultimate failure of the exhaust system.

Some prior art gaskets have recognized the importance of compensating for the relative movement between the exhaust manifold and the cylinder head. In one such design, a gasket assembly includes first and second gasket members and an intermediate metal plate interposed between the first and second members. The first and second members are temporarily and slidably attached to respective sides of the intermediate plate in such a manner that relative sliding occurs between the intermediate metal plate and each of the first and second members. This design allows effective absorption of the thermal expansion and contraction of the exhaust manifold relative to the cylinder head. However, the design requires three separate layers which increases the cost of the gasket. Further, the first and second members and the intermediate plate are composed of metals having high coefficients of friction which do not slide easily over each other causing wearing of the gasket material and ultimate failure of the gasket.

The present invention is directed to overcoming one or more of the problems as set forth above.

DISCLOSURE OF THE INVENTION

In one aspect of the present invention a gasket assembly is provided for compensating for thermally induced movement. The gasket assembly is adapted for use in an internal combustion engine having a cylinder head and an exhaust manifold with the gasket assembly being disposed between the cylinder head and the exhaust manifold to form a pressure tight seal. The gasket assembly includes a first substantially flat plate which has an outer side and an opposite inner side and a second substantially flat plate which has an outer side and an opposite inner side. A first layer of material having a generally low coefficient of friction is attached to the inner side of the first plate to define a first plate assembly. A second layer of material having a generally low coefficient of friction is attached to at least one of the sides of the second plate to define a second plate assembly. The gasket assembly further includes means for interconnecting the first and second plate assemblies so that the first and second layers of material are in contacting relationship.

The present invention overcomes the disadvantages of the prior art as set forth above. For example, the present invention utilizes first and second plates which have a layer of material having a low coefficient of friction attached on respective sides to define first and second plate assemblies. The first and second plates are interconnected so that the layers of material having the low coefficient of friction are in contacting relationship enhancing the sliding capabilities between the layers while reducing the amount of wear between the layers.

BRIEF DESCRIPTION OF THE DRAWINGS

FIG. 3 is an elevational view of the gasket assembly of the present invention.

FIG. 4 is an enlarged sectional view taken along line 4—4 in FIG. 3.

FIG. 5 is an enlarged sectional view taken along line 5—5 in FIG. 3.

BEST MODE FOR CARRYING OUT THE INVENTION

Figure 1:
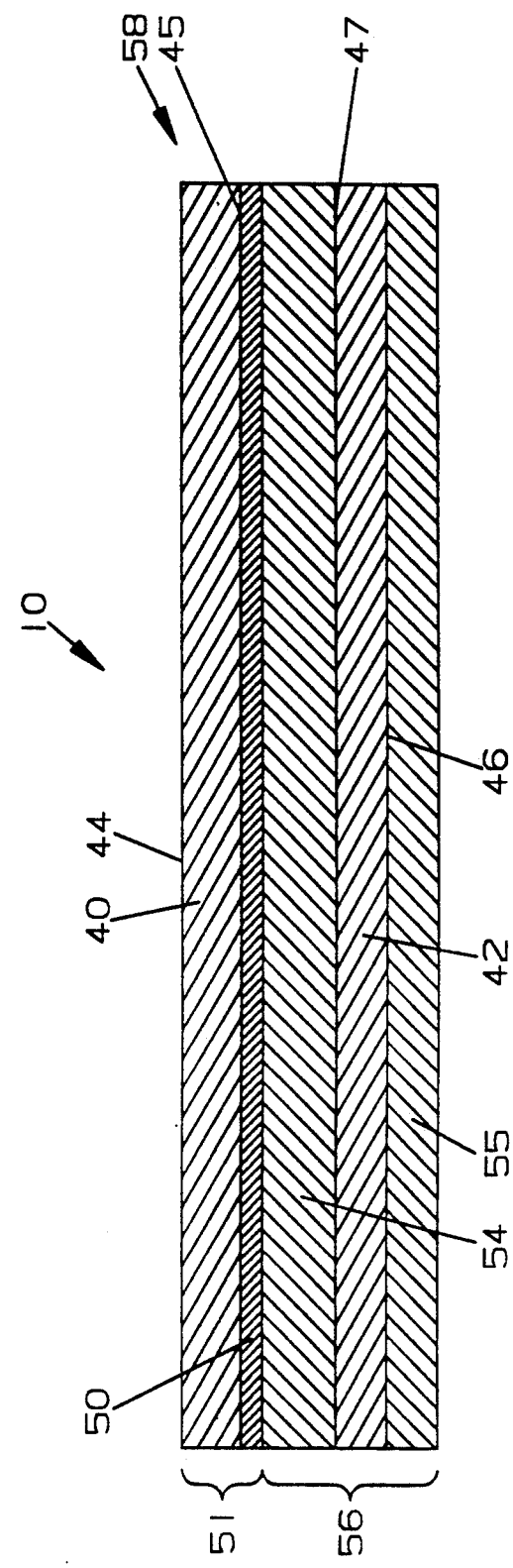
FIG. 1 is a sectional view of the gasket assembly of the present invention.
Figure 2:
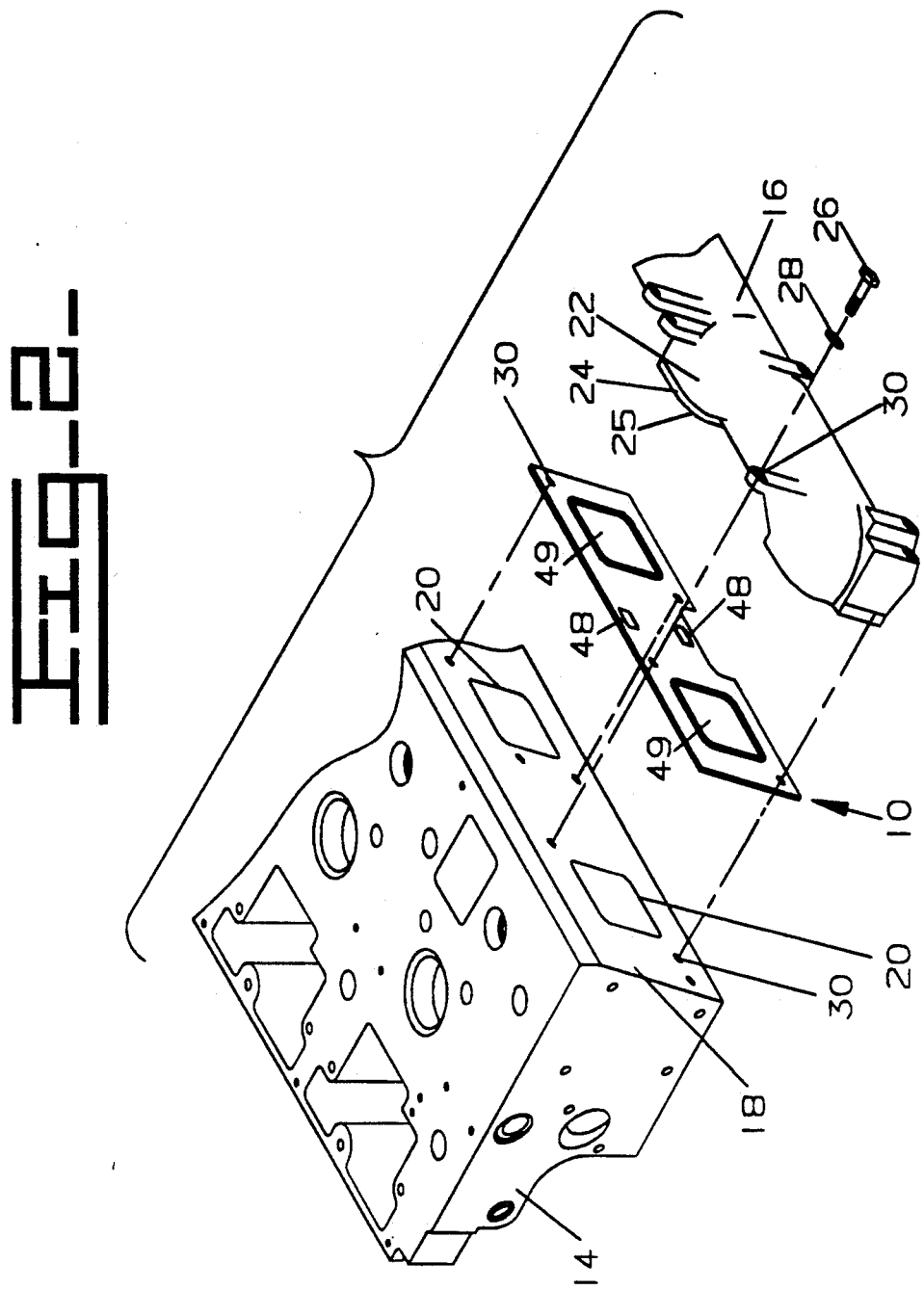
FIG. 2 is a partial exploded view of the assembly of the present invention with a cylinder head and an exhaust manifold.

A gasket assembly 10 compensating for the thermally induced movement between a cylinder head 14 and an exhaust manifold 16 of an internal combustion engine is shown in FIGS. 1 and 2. As shown by the exploded view of FIG. 2, the cylinder head 14 has a flat machined surface 18 and a plurality of exhaust ports 20. The exhaust manifold 16 has a plurality of exhaust branches 22 extending therefrom which terminate at a plurality of flanges 24. The flanges 24 have machined surfaces 25 corresponding to the machined surface 18 of the cylinder head. A plurality of suitable bolts 26 and a plurality of washers 28 are used for securing the exhaust manifold 16 and the gasket assembly 10 to the cylinder head 14. The cylinder head 14, exhaust manifold, and the gasket assembly 10 are each formed with a plurality of spaced holes 30 through which the bolts 26 pass. The holes 30 in the gasket assembly 10 are slightly larger than the bolts 26.

The gasket assembly 10 is disposed between the cylinder head 14 and the exhaust manifold 16 to form a pressure tight seal. Referring specifically to FIGS. 1-5, the gasket assembly 10 includes a pair of first and second substantially flat plates, 40 and 42 respectively. The first plate 40 has an outer side 44 and an opposite inner side 45 and the second plate 42 has an outer side 46 and an opposite inner side 47. Each of the plates are formed from a material having a generally high coefficient of friction such as stainless steel or any other suitable material. The plates 40 and 42 each have a pair of elongated slots 48 located substantially near the central portion thereof. The elongated slots 48 have a predetermined length. A pair of rectangular shaped holes 49 corresponding to the exhaust ports 20 of the cylinder head 14 are formed in the plates 40 and 42. A first layer 50 of material is attached to the inner side 45 of the first plate 40 defining a first plate assembly 51 and is comprised of a material having a generally low coefficient of friction such as polytetrafluoroethylene. The first layer 50 is attached to the first plate 40 by spraying a coating of the material onto the first plate 40, however, any suitable method of attachment can be used. A second layer 54 of material is attached to inner side 47 of the second plate 42 and a third layer 55 of material is attached to the outer side 46 of the second plate 42. The attachment of the second layer 54 of material to the second plate 42 individually or the attachment of both the second and third layers 54 and 55 in combination define a second plate assembly 56. Both the second and third layers 54 and 55, respectively, are comprised of a material having a generally low coefficient of friction such as graphite. The second and third layers 54 and 55 are attached to the second plate 42 by any suitable method such as the well-known method of mechanically clinching the graphite to the stainless steel.

A means 58 is provided for interconnecting the first and second plate assemblies 51 and 56 so that the first layer 50 of material and the second layer 54 of material are in contacting relationship. The interconnecting means 58 may include a plurality of securing tabs 60 integrally extending from the first plate assembly 51 and extending through the slots 48 or any other suitable method for attaching the first and second plate assemblies 51 and 56. The securing tabs 60 have a lip 62 which is hooked around the second plate assembly 56 in contacting relationship with the third layer of material 55. The securing tabs 60 have a predetermined length which is less than the length of the slots 48. A protecting means 64 such as a cover 66 is positioned against the third layer of material 55. The cover 66 has a lip 68 which is hooked around the second plate assembly 56 in contacting relationship with the first plate 40 so that the cover 66 encompasses the rectangular shaped holes 49. The cover 66 is formed from a material having a high coefficient of friction, such as stainless steel.

INDUSTRIAL APPLICABILITY

The gasket assembly 10 provides a pressure tight seal which compensates for thermally induced movement between the cylinder head 14 and the exhaust manifold 16. In order to accomplish this, the first and second plate assemblies 51,56 are attached by extending the securing tabs 60 through the slots 48 and hooking the securing tabs 60 around the second plate assembly 56. The securing tabs 60 are hooked in a manner to provide a sliding relationship between the first layer of material 50 and the second layer of material 54 and to bring the first and second layers 50,54 into contacting relationship. The gasket assembly 10 is then positioned between the cylinder head 14 and the exhaust manifold 16 as the exhaust manifold is assembled to the cylinder head 14. The graphite material of the second and third layers 54 and 55 ensure a good seal with the exhaust manifold 16 as it is crushed between the cylinder head 14 and the exhaust manifold 16 during the assembly process.

During operation of the engine, the exhaust manifold 16 moves relative to the cylinder head 14 due to the cyclic temperature changes which normally occur during engine operation. The high coefficient of friction of the protective cover 66 substantially eliminates movement between the manifold 16 and the second plate assembly 56. The high coefficient of friction of the first plate 40 substantially eliminates movement between the cylinder head 14 and the first plate assembly 51. The polytetrafluoroethylene material of the first layer 50 and the graphite material of the second layer 54 which are in contacting relationship each have a low coefficient of friction so that the first and second layers 50 and 54 are able to slide freely against each other to the extent permitted by the length difference between the slots 48 and the securing tabs 60. The diameter differences between the bolts 26 and the holes 30 of the gasket assembly 10 and the manifold 16 allow for freedom of movement between the first and second layers 50 and 54. The protective cover 66 shields the graphite material attached on the second plate 42 from extreme heat and possible erosion around the exhaust ports 20.

In view of the above, it is apparent that the present invention provides an improved gasket to compensate for thermally induced movement between a cylinder head and an exhaust manifold. The present invention utilizes a simplified gasket assembly design comprising a first plate and a second plate which are formed from a material having a generally high coefficient of friction. The first and second plates have a low coefficient of friction material attached to the inner sides thereof defining a first and a second plate assembly, respectively. The first and second plate assemblies are attached so that the inner sides are in contacting relationship. The low coefficient of friction of the material attached to the inner sides allows the plate assemblies to slide relative to each other thereby compensating for the relative movement between the cylinder head and the exhaust manifold. The improved slidability of the plate assemblies also improves the life of the gasket material by virtually eliminating wear between the plate assemblies while the protective cover eliminates material wear around the rectangular shaped holes.

I claim:

1. A gasket assembly adapted for use in an internal combustion engine having a cylinder head and an exhaust manifold with the gasket assembly being disposed between the cylinder head and the exhaust manifold when installed to form a pressure tight seal, comprising:
    a first substantially flat plate having an outer side and an opposite inner side;
    a second substantially flat plate having an outer side and an opposite inner side;
    the first and the second plate both having an elongated slot with a predetermined length and a rectangular shaped hole formed therein;
    a first layer of material having a low coefficient of friction relative to the first plate attached to the inner side of the first plate defining a first plate assembly;
    a second layer of material having a low coefficient of friction relative to the second plate attached to at least one of the sides of the second plate defining a second plate assembly; and
    means for interconnecting the first and second plate assemblies including a plurality of securing tabs having a predetermined length less than the predetermined length of the slot, the securing tabs integrally extending from the first plate assembly and extending through the slot and being hooked around the second plate assembly to establish a sliding relationship between the first layer of material and the second layer of material.

2. The gasket assembly as set forth in claim 1, wherein the first and second plates are formed from a material having a high coefficient of friction relative to the first and second layers.

3. The gasket assembly as set forth in claim 2, wherein the material of the second layer is different than the material of the first layer.

4. The gasket assembly as set forth in claim 3, wherein a third layer of material is attached to the side opposite the at least one side of the second plate.

5. The gasket assembly as set forth in claim 4, including means for protecting the second layer and the third layer of material.

6. The gasket assembly as set forth in claim 5, wherein the protecting means includes a cover positioned against the third layer of material, the cover having a lip which is hooked around the second plate assembly to encompass the rectangular shaped hole.

7. The gasket assembly of claim 6, wherein the material for the first and second plates is stainless steel.

8. The gasket assembly of claim 7, wherein the material for the first layer is polytetrafluoroethylene and the material for the second layer is graphite.

9. A gasket assembly adapted for use in an internal combustion engine having a cylinder head and an exhaust manifold with the gasket assembly being disposed between the cylinder head and the exhaust manifold when installed to form a pressure tight seal, comprising:

a first substantially flat plate having an outer side and an opposite inner side;

a second substantially flat plate having an outer side and an opposite inner side;

the first and the second plates both having an elongated slot with a predetermined length and a rectangular shaped hole formed therein;

a first layer of material having a low coefficient of friction relative to the first plate attached to the inner side of the first plate defining a first plate assembly;

a second layer of material different than the material of the first layer and having a low coefficient of friction relative to the second plate attached to at least one of the sides of the second plate defining a second plate assembly;

the first and second plates are formed from a material having a high coefficient of friction relative to the first and second layers; and means for interconnecting the first and second plate assemblies including a plurality of securing tabs having a predetermined length less than the predetermined length of the slot, the securing tabs integrally extending from the first plate assembly and extending through the slot and being hooked around the second plate assembly to establish a sliding relationship between the first layer of material and the second layer of material.

10. The gasket assembly as set forth in claim 9, including means for protecting the second layer and the third layer of material.

11. The gasket assembly as set forth in claim 10, wherein the protecting means includes a cover positioned against the third layer of material, the cover having a lip which is hooked around the second plate assembly to encompass the rectangular shaped hole.

12. The gasket assembly as set forth in claim 11, wherein the material used for the first and second plates is stainless steel.

13. The gasket assembly as set forth in claim 12, wherein the material for the first layer is polytetrafluoroethylene and the material for the second layer is graphite.

* * * * *